United States Patent
Ferguson (10) Patent No.: US 10,190,528 B2
(45) Date of Patent: Jan. 29, 2019

(54) OPPOSED PISTON ENGINE CYLINDER WITH CARBON SCRAPER

(71) Applicant: Fairbanks Morse, LLC, Charlotte, NC (US)

(72) Inventor: Justin Ferguson, Elgin, IL (US)

(73) Assignee: Fairbanks Morse LLC, Charlotte, NC (US)

( * ) Notice: Subject to any disclaimer, the term of this patent is extended or adjusted under 35 U.S.C. 154(b) by 0 days.

(21) Appl. No.: 15/237,043

(22) Filed: Aug. 15, 2016

(65) Prior Publication Data

US 2018/0216567 A1    Aug. 2, 2018

(51) Int. Cl.
  *F02B 75/28* (2006.01)
  *F02F 1/00* (2006.01)
  (Continued)

(52) U.S. Cl.
  CPC ........... *F02F 1/004* (2013.01); *F01B 7/14* (2013.01); *F02B 75/18* (2013.01); *F02B 75/28* (2013.01); *F02B 77/04* (2013.01); *F02F 1/186* (2013.01); *F16J 10/02* (2013.01); *F01B 7/02* (2013.01); *F02B 75/26* (2013.01); *F02B 75/285* (2013.01); *F02F 2001/006* (2013.01)

(58) Field of Classification Search
  CPC ........ F02B 75/28; F02B 75/285; F02B 75/26; F01B 7/02
  See application file for complete search history.

(56) References Cited

U.S. PATENT DOCUMENTS

| 4,352,343 A | 10/1982 | Batoni et al. |
| 2009/0095248 A1* | 4/2009 | Kumar ............... F02F 1/004 |
| | | 123/193.2 |

(Continued)

FOREIGN PATENT DOCUMENTS

| DE | 19811780 C1 * | 8/1999 | ............... F02F 1/18 |
| WO | 2015/038425 A1 | 3/2015 | |

OTHER PUBLICATIONS

Shobin P., "Importance of Compression Ratio," [online] Motor Vehicle Maintenance & Repair Stack Exchange, Retrieve from the Internet, Oct. 30, 2017, https://mechanics.stackexchange.com/questions/17419/importance-of-engine-compression-ratio, 2 pages.

(Continued)

*Primary Examiner* — Jacob Amick
*Assistant Examiner* — Charles Brauch
(74) *Attorney, Agent, or Firm* — Perkins Coie LLP (57) ABSTRACT

Technology is provided for a cylinder with a carbon scraper for use in an opposed piston engine. The cylinder includes a cylinder body having first and second piston bores extending along a central axis for reciprocation of corresponding first and second pistons therein. A chamber bore is located between the first and second piston bores and first and second annular grooves are located on opposite ends of the chamber bore. The chamber bore extends between and is inclusive of a top-dead-center position of a top land of each of the first and second pistons. The first and second piston bores have a piston diameter and the chamber bore has a chamber diameter smaller than the piston diameter. For example, the chamber diameter can be between about 0.004 and about 0.020 inches smaller than the piston diameter.

13 Claims, 5 Drawing Sheets

(51) Int. Cl.
*F02B 77/04* (2006.01)
*F16J 10/02* (2006.01)
*F01B 7/14* (2006.01)
*F02B 75/18* (2006.01)
*F02F 1/18* (2006.01)
*F01B 7/02* (2006.01)
*F02B 75/26* (2006.01)

(56) References Cited

U.S. PATENT DOCUMENTS

| | | | |
|---|---|---|---|
| 2010/0212613 A1* | 8/2010 | Lemke | F01B 7/14 123/52.2 |
| 2012/0186561 A1* | 7/2012 | Bethel | F02B 75/282 123/51 R |
| 2013/0199503 A1* | 8/2013 | Callahan | F16J 10/04 123/51 R |
| 2015/0292432 A1 | 10/2015 | Stephenson et al. | |

OTHER PUBLICATIONS

International Search Report and Written Opinion, issued in PCT application No. PCT/US2017/045569 dated Oct. 19, 2017, 10 pages.

\* cited by examiner

*FIG. 5* ic # OPPOSED PISTON ENGINE CYLINDER WITH CARBON SCRAPER

TECHNICAL FIELD

This patent application is directed to opposed piston engines and, more specifically, to opposed piston engine cylinders.

BACKGROUND

Carbon scrapers are sometimes used in large bore and over-the-road four-stroke diesel engines (typically called an anti-polish ring or scraper ring). A carbon scraper is a separate iron ring inserted into the cylinder bore which scrapes carbon off the top land of a piston as it reaches top-dead-center. Carbon accumulation on the piston can polish the cylinder bore, which leads to various failure modes that ultimately shortens engine overhaul intervals.

BRIEF DESCRIPTION OF THE DRAWINGS

Embodiments of the opposed piston engine cylinder with carbon scraper introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A cylinder with a carbon scraper for use in an opposed piston engine is disclosed. In an embodiment, the cylinder includes a cylinder body having first and second piston bores extending along a central axis for reciprocation of corresponding first and second opposed pistons therein. A chamber bore is located between the first and second piston bores and first and second annular grooves are located on opposite ends of the chamber bore. In some embodiments, the chamber bore extends between and is inclusive of a top-dead-center (TDC) position of a top land (i.e., land closest to piston head) of each of the first and second pistons. In an embodiment, the first and second piston bores have a piston diameter and the chamber bore has a chamber diameter smaller than the piston diameter. For example, in some embodiments, the chamber diameter is between about 0.004 and about 0.020 inches smaller than the piston diameter. In other embodiments, the chamber diameter is substantially the same as the piston diameter. In another embodiment, the chamber diameter is larger than the piston diameter.

General Description

Various examples of the device and systems introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
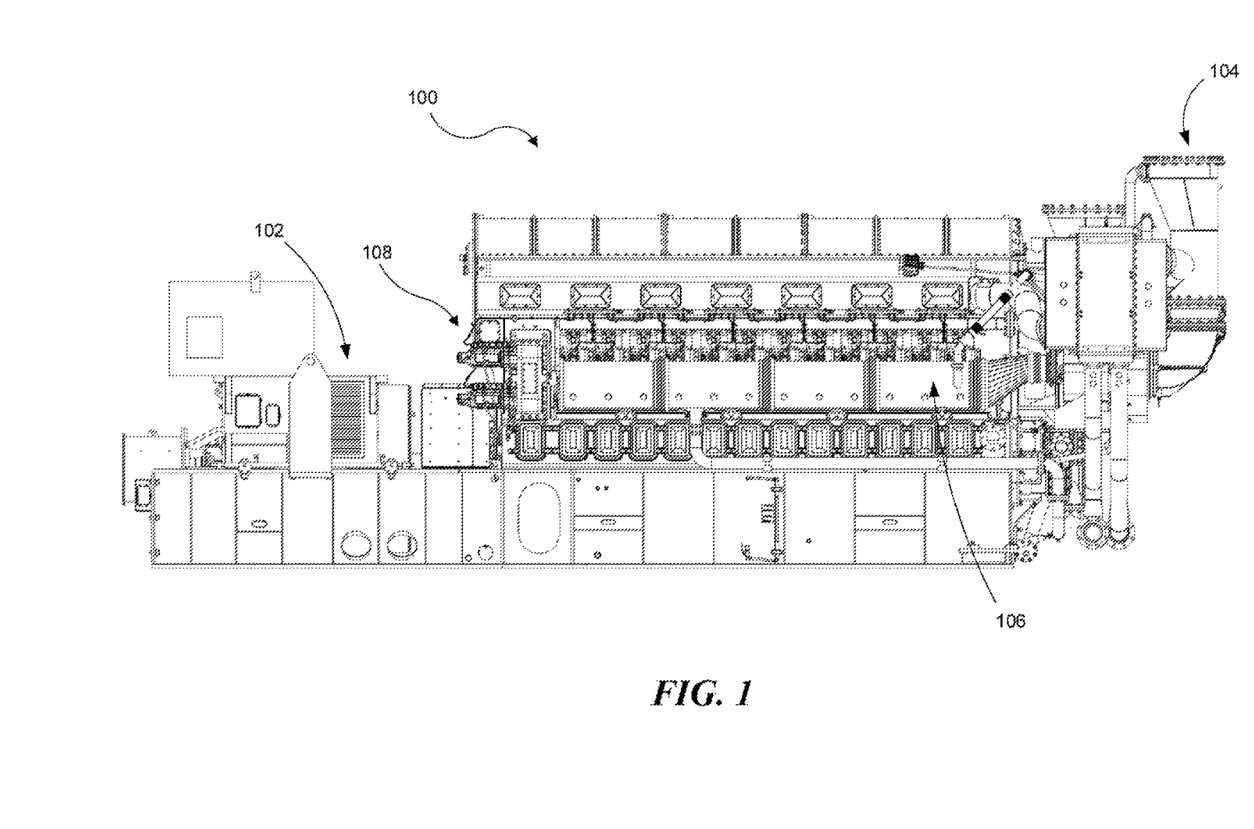
FIG. 1 is a side view in elevation of a multi-cylinder opposed piston engine according to a representative embodiment.

FIG. 1 illustrates a vertically oriented multi-cylinder opposed piston engine 100 according to a representative embodiment. In some embodiments, engine 100 is configured for electrical power generation and is connected to a generator 102. In other embodiments, the engine may directly or indirectly drive equipment or propulsion systems, such as for example and without limitation, pumps, drive trains, wheels, propellers, etc. Engine 100 may be used in mobile as well as stationary applications. The engine 100 includes various components and subsystems, such as an engine control system 108, an air intake system 104, and an exhaust system 106, for example.

Figure 2:
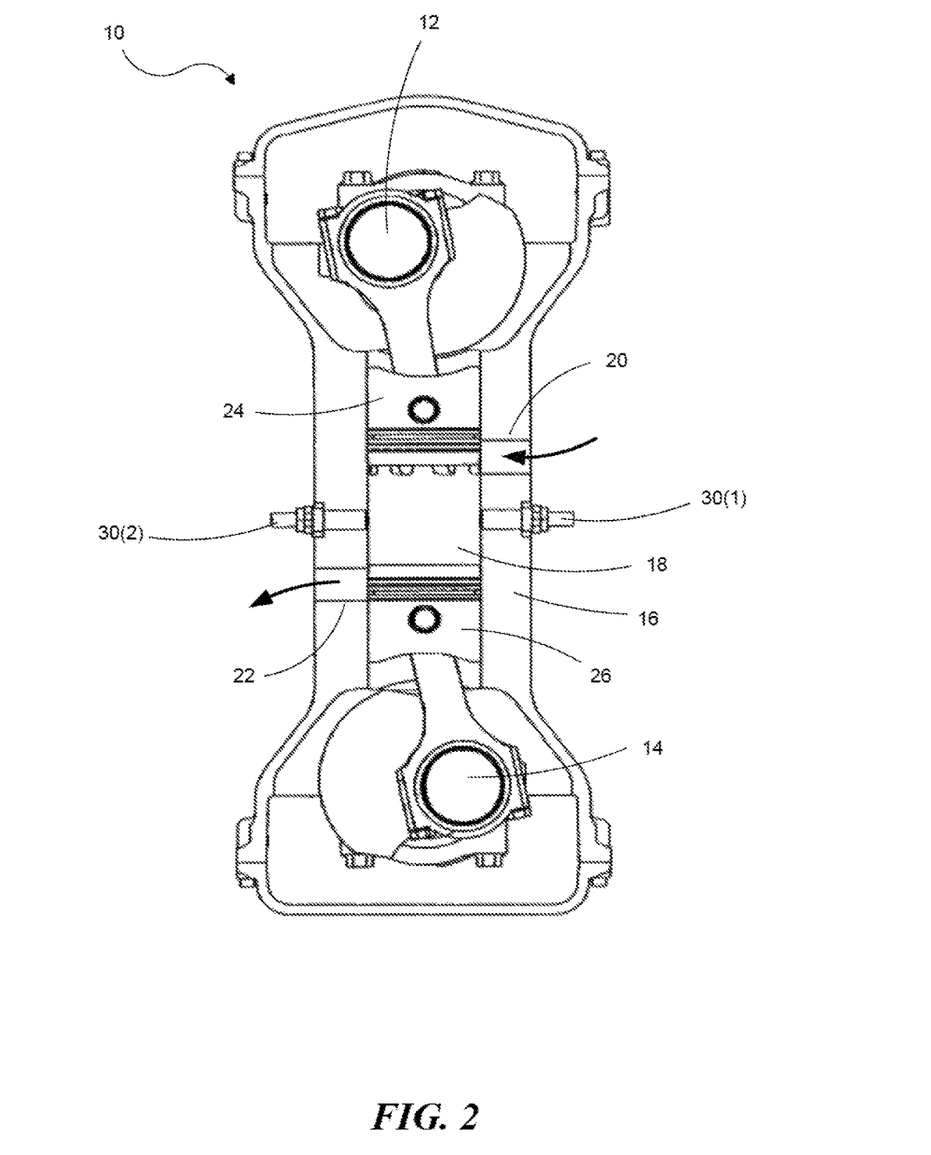
FIG. 2 is a schematic representation of a vertically oriented opposed piston engine.

FIG. 2 is a simplified schematic representation of an opposed piston engine. Opposed piston engine 10 includes a vertically oriented cylinder 16 that encloses a combustion chamber 18 between first and second pistons 24 and 26, respectively. First piston 24 drives a first or upper crankshaft 12 and second or lower piston 26 drives a second or lower crankshaft 14. The designation of upper, lower, left, right, or the like provides relative orientation on the figure and should not be considered limiting. The upper and lower crankshafts 12 and 14 are rotatably connected together with a plurality of spur gears (not shown). Air from an intake system, such as intake system 104, is forced into the combustion chamber 18 through intake port 20. Exhaust gases are exhausted through exhaust port 22 and into an exhaust system, such as exhaust system 106. Engine 10 includes a pair of injectors 30(1) and 30(2) that provide fuel to the combustion chamber 18. In the illustrated embodiment, the injectors 30 are diametrically opposed to each other. In some embodiments, the injectors 30 are configured to supply a liquid fuel, such as diesel, to the combustion chamber 18. In other embodiments, the injectors 30 can be configured for gaseous fuel such as natural gas. In some embodiments, each injector can be configured to inject a different type of fuel. For example, injector 30(1) can be configured to supply diesel to the combustion chamber 18 while injector 30(2) is configured to supply natural gas to the combustion chamber 18.

Until now carbon scrapers have not been used on opposed piston engines because inserting a separate iron cylinder into the center of an opposed piston engine cylinder liner is impractical. Conventional engines use a separate ring inserted into the cylinder because the cylinder must be machined from the top (i.e., cylinder head side) of the block. Also, the piston must be inserted from the top because the crank journals block the bottom side (i.e., crankshaft side) of the cylinder. It would be very difficult to machine and hone a cylinder bore past a machined carbon scraper step. If a carbon scraper were somehow machined into a conventional engine cylinder, the piston could not be inserted into the cylinder without excessive clearance between the piston and piston bore.

In the disclosed opposed piston engine cylinder liners, the carbon scraper is machined into the cylinder liner between the piston bores. This is possible because, in the disclosed opposed piston engine cylinder liners, each piston is installed from the side of its respective crankshaft and the opposed piston engine cylinder liner's piston bores can each be machined from its respective crankshaft side. However, in some embodiments, both piston bores can be machined from the same end of the cylinder liner. The term cylinder as used herein refers to the space in which a piston travels and is inclusive of sleeved and sleeveless cylinders. Accordingly, it should be understood that the disclosed technology can be implemented in a cylinder liner as described herein or directly in the cylinder bore of a cast iron engine block, for example.

Figure 3:
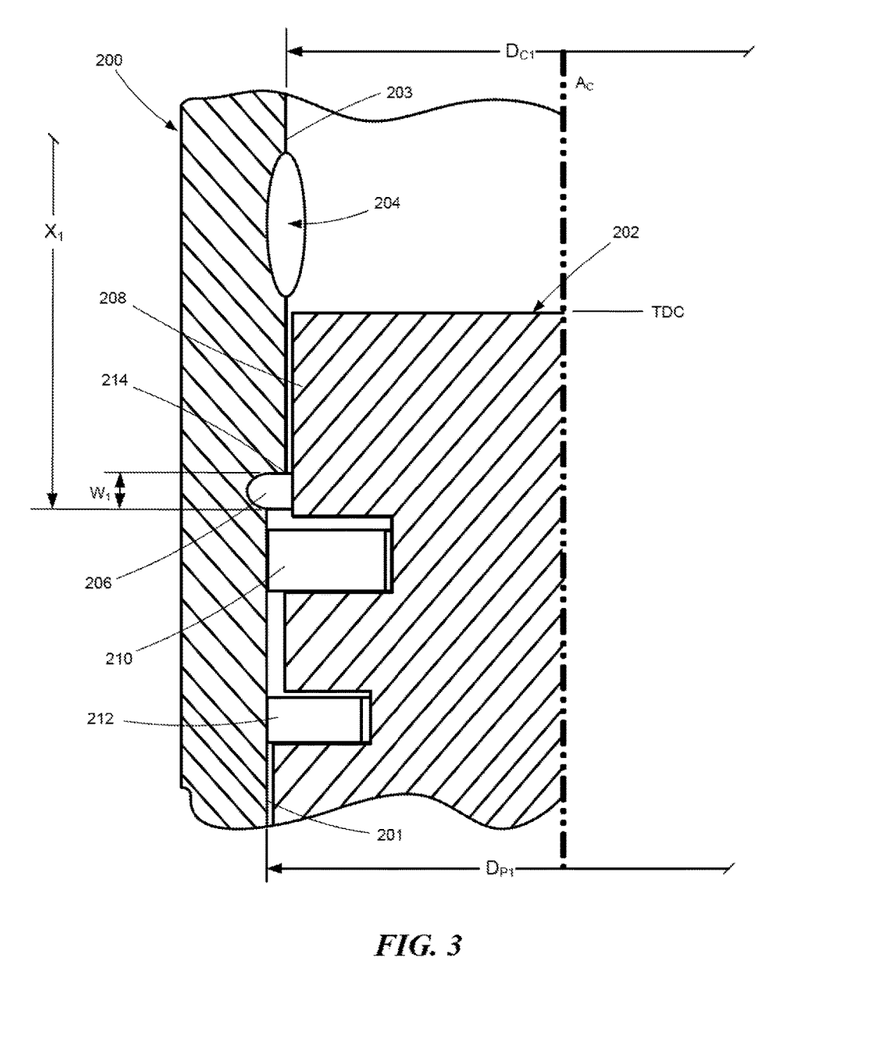
FIG. 3 is a partial cross-section of an opposed piston engine cylinder liner with a carbon scraper according to a representative embodiment.

FIG. 3 illustrates a portion of an opposed piston engine cylinder liner 200 with a carbon scraper according to a representative embodiment. The cylinder liner 200 includes a cylinder liner body including first and second piston bores 201 extending along a central axis $A_C$. A chamber bore 203 is located between the first and second piston bores 201. The piston bores 201 are configured to receive corresponding first and second opposed pistons 202 for reciprocating movement therein. Only one piston bore 201 and piston 202 are shown in the figures. With reference to FIG. 2, it should be understood that an opposed piston is located on the other side of injector port 204. Piston 202 includes one or more piston rings 210, 212 (e.g., compression rings and/or oil control rings).

The first and second piston bores 201 have a piston diameter $D_{P1}$ and the chamber bore 203 has a chamber diameter $D_{C1}$ smaller than the piston diameter $D_{P1}$. In at least one embodiment, the piston bore diameter ($D_{P1}$) is approximately 8.125 inches. In some embodiments, the chamber diameter $D_{C1}$ is between about 0.004 and about 0.020 inches smaller than the piston diameter $D_{P1}$. This difference in diameter corresponds to a step of between about 0.002 and about 0.010 inches. The scraper edge 214 created by the difference in diameter operates to scrape off any carbon buildup on top land 208 (i.e., land closest to piston head) of piston 202 during piston motion. Prevention of carbon buildup prolongs the life of the honed surface of piston bore 201, and increases the life of the liner before necessitating replacement. In some embodiments, the chamber bore 203 extends a distance $X_1$ between and inclusive of the TDC position of the top land 208 of each of the first and second opposed pistons 202.

In some embodiments, the cylinder liner 200 includes first and second annular grooves 206 located on opposite ends of the chamber bore 203 to provide an undercut to reduce stress concentration in the liner 200, and allow for honing the entire piston bore 201. In some embodiments, the annular grooves 206 have a width $W_1$ of between about 0.010 and about 0.050 inches.

In an embodiment, the cylinder liner 200 can be machined with a suitable large lathe or boring machine, such as a vertical boring mill, with capability to cut in two axes (e.g., X and Z). The machining process can include boring from one end of the cylinder liner 200 and rough cutting the chamber diameter $D_{C1}$ through the entire cylinder liner 200. Finish boring includes machining the first piston bore diameter $D_{P1}$ to the first scraper edge 214, offsetting the tool clear of the chamber diameter $D_{C1}$, moving the tool past the chamber bore 203, and then feeding the tool back to the second piston diameter $D_{P1}$ to continue boring the second piston bore 201 of the cylinder liner 200. The machine changes tools to a grooving tool and moves back into the chamber bore 203 to plunge cut and form the annular grooves 206 at each end of the chamber bore 203. A honing machine hones the piston bores 201 up to the corresponding scraper edges 214. The piston bores 201 are honed from each end of the cylinder liner 200.

Figure 4:
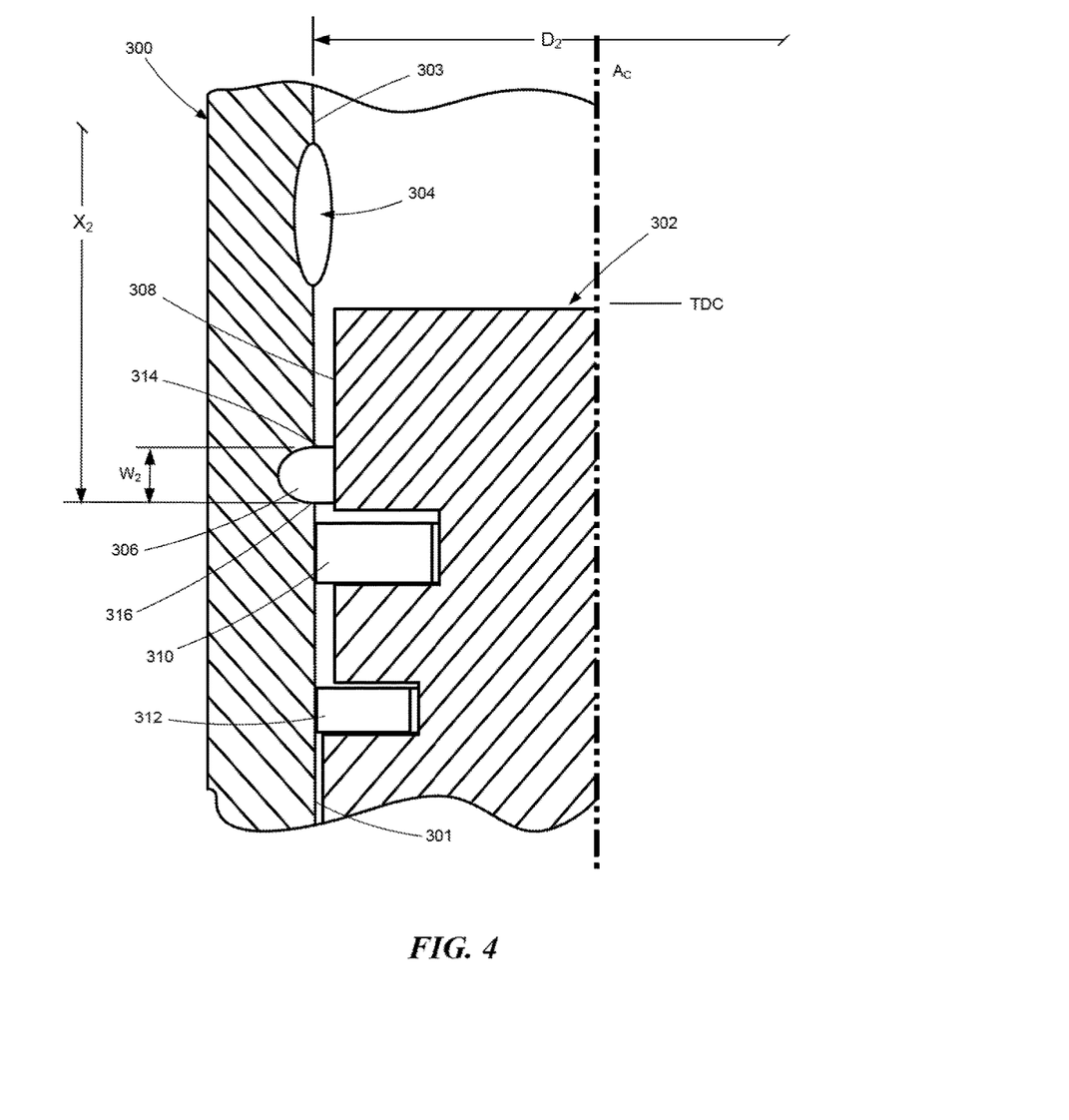
FIG. 4 is a partial cross-section of an opposed piston engine cylinder liner with a carbon scraper according to another representative embodiment.

FIG. 4 illustrates an opposed piston engine cylinder liner 300 with a carbon scraper according to another representative embodiment. The cylinder liner 300 includes a cylinder body including first and second piston bores 301 extending along a central axis $A_C$. A chamber bore 303 is located between the first and second piston bores 301. The piston bores 301 are configured to receive corresponding first and second opposed pistons 302 for reciprocating movement therein. Only one piston bore 301 and piston 302 are shown in the figures. With reference to FIG. 2, it should be understood that an opposed piston is located on the other side of injector port 304. Piston 302 includes one or more piston rings 310, 312 (e.g., compression rings and/or oil control rings).

In the embodiment of FIG. 4, the first and second piston bores 301 and the chamber bore 303 have a common diameter $D_2$. The cylinder liner 300 includes first and second annular grooves 306 located on opposite ends of the chamber bore 303. In some embodiments, the annular grooves 306 have a width $W_2$ of between about 0.010 and about 0.050 inches. Each annular groove 306 creates a pair of scraper edges 314 and 316. The scraper edges 314 and 316 created by the annular grooves 306 operate to scrape off any carbon buildup on top land 308 of piston 302 during piston motion. In some embodiments, the chamber bore 303 extends a distance $X_2$ between and inclusive of the TDC position of the top land 308 of each of the first and second opposed pistons 302.

As carbon accumulates on the top land 308, it grows to a size that it contacts the chamber bore 303 and/or the piston bore 301, at which point the edges 314, 316 catch on the carbon and remove it, especially on the left and right sides of the engine where the piston rocks in the bore. In some embodiments, the groove could also be biased to have a sharp edge on one side, with a more generous lead in on the other, so that scraping is preferential in one direction or the other.

In an embodiment, the process of machining the cylinder liner 300 can include boring from one end of the cylinder liner 300 and finish boring the piston diameter $D_2$ through the entire cylinder liner 300. The piston bores 301 are honed through the entire cylinder liner 300. In some embodiments, the piston bores 301 can be honed from one end of the cylinder liner 300. The machine can change tools to a grooving tool and move back into the chamber bore 303 to plunge cut and form the annular grooves 306 at each end of the chamber bore 303.

Figure 5:
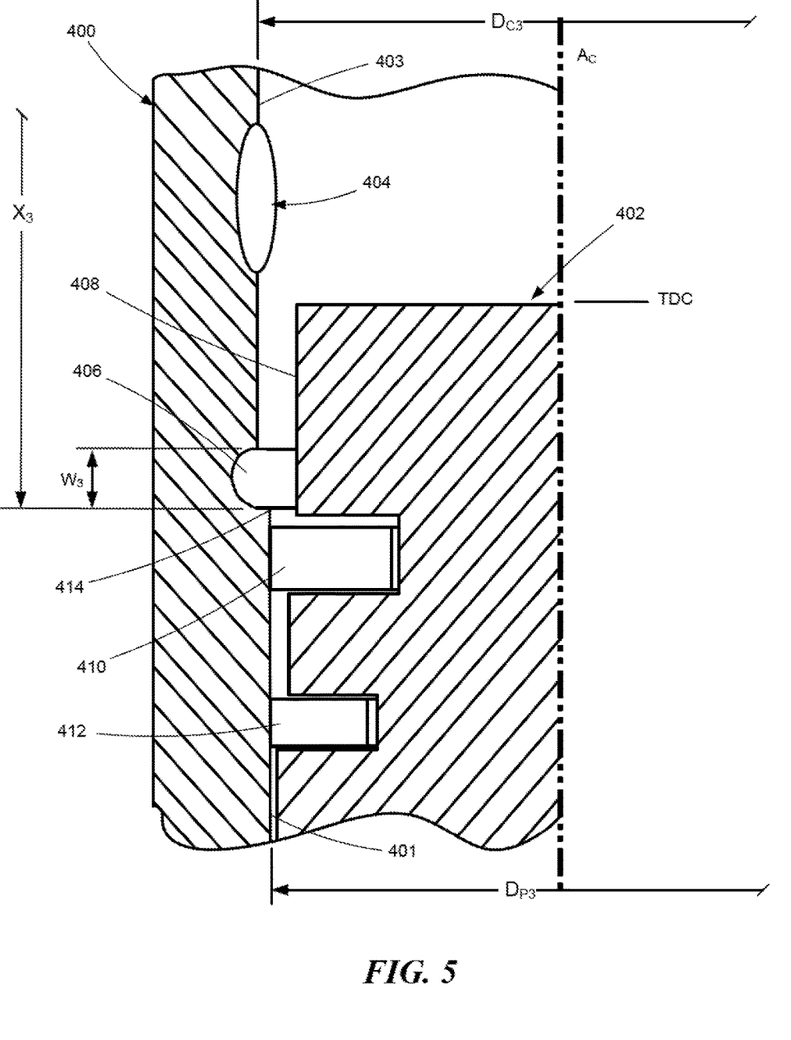
FIG. 5 is a partial cross-section of an opposed piston engine cylinder liner with a carbon scraper according to a further representative embodiment.

FIG. 5 illustrates an opposed piston engine cylinder liner 400 with a carbon scraper according to a representative embodiment. The cylinder liner 400 includes a cylinder body including first and second piston bores 401 extending along a central axis $A_C$. A chamber bore 403 is located between the first and second piston bores 401. The piston bores 401 are configured to receive corresponding first and second opposed pistons 402 for reciprocating movement therein. Only one piston bore 401 and piston 402 are shown in the figures. With reference to FIG. 2, it should be understood that an opposed piston is located on the other side of injector port 404. Piston 402 includes one or more piston rings 410, 412 (e.g., compression rings and/or oil control rings).

The first and second piston bores 401 have a piston diameter $D_{P3}$ and the chamber bore 403 has a chamber diameter $D_{C3}$ larger than the piston diameter $D_{P3}$. In some embodiments, the chamber diameter $D_{C3}$ is between about 0.004 and about 0.020 inches larger than the piston diameter $D_{P3}$. This difference in diameter corresponds to a step of between about 0.002 and about 0.010 inches. The scraper edge 414 created by the difference in diameter operates to scrape off any carbon buildup on top land 408 of piston 402 during piston motion. Prevention of carbon buildup prolongs the life of the honed surface of piston bore 401, and increases the life of the liner before necessitating replacement. In some embodiments, the chamber bore 403 extends a distance $X_3$ between and inclusive of the TDC position of the top land 408 of each of the first and second opposed pistons 402.

In some embodiments, the cylinder liner 400 includes first and second annular grooves 406 located on opposite ends of the chamber bore 403 to provide an undercut to reduce stress concentration in the liner 400, and allow for honing the entire piston bore 401. In some embodiments, the annular grooves 406 have a width $W_3$ of between about 0.010 and about 0.050 inches.

In an embodiment, the process of machining the cylinder liner 400 can include boring from one end of the cylinder liner 400 and finish boring the piston diameter $D_{P3}$ through the entire cylinder liner 400. The piston bores 401 are honed through the entire cylinder liner 400. In some embodiments, the piston bores 401 can be honed from one end of the cylinder liner 400. The machine would then position and recess bore the chamber bore 403. The machine can change tools to a grooving tool and move back into the chamber bore 403 to plunge cut and form the annular grooves 406 at each end of the chamber bore 403.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A cylinder for an opposed piston engine, comprising:
    a cylinder body including:
        first and second piston bores extending along a central axis for reciprocation of corresponding first and second opposed pistons therein, wherein the first and second piston bores have a piston bore diameter;
        a chamber bore located between the first and second piston bores, wherein the chamber bore has a chamber diameter smaller than the piston bore diameter; and
        first and second open annular scraper grooves located on opposite ends of the chamber bore.

2. The cylinder of claim 1, wherein the chamber diameter is between about 0.004 and about 0.020 inches smaller than the piston bore diameter.

3. The cylinder of claim 1, wherein the chamber bore extends between and is inclusive of a top-dead-center position of a top land of each of the first and second opposed pistons.

4. The cylinder of claim 1, wherein the first and second annular grooves are each between about 0.010 and about 0.050 inches wide.

5. A cylinder for an opposed piston engine, comprising:
    a cylinder body including:
        first and second piston bores extending along a central axis for reciprocation of corresponding first and second opposed pistons therein; and
        a chamber bore having a generally smooth surface located between the first and second piston bores;
        wherein the first and second piston bores have a piston bore diameter and the chamber bore has a chamber diameter smaller than the piston bore diameter, whereby the chamber bore includes first and second scraper edges.

6. The cylinder of claim 5, wherein the chamber bore extends between and is inclusive of a top-dead-center position of a top land of each of the first and second opposed pistons.

7. The cylinder of claim 6, further comprising first and second annular grooves located on opposite ends of the chamber bore.

8. The cylinder of claim 7, wherein the first and second annular grooves are each between about 0.010 and about 0.050 inches wide.

9. The cylinder of claim 5, wherein the chamber diameter is between about 0.004 and about 0.020 inches smaller than the piston bore diameter.

10. A multi-cylinder opposed piston engine, comprising:
a plurality of cylinder liners, each including:
    a liner body including:
        first and second piston bores extending along a central axis for reciprocation of corresponding first and second opposed pistons therein, wherein the first and second piston bores have a piston bore diameter;
        a chamber bore located between the first and second piston bores, wherein the chamber bore has a chamber diameter smaller than the piston bore diameter; and
        first and second open annular scraper grooves located on opposite ends of the chamber bore;
    a first set of pistons each positioned in a respective one of the first piston bores and connected to a first crankshaft; and
    a second set of pistons each positioned in a respective one of the second piston bores and connected to a second crankshaft.

11. The engine of claim 10, wherein the chamber diameter is between about 0.004 and about 0.020 inches smaller than the piston bore diameter.

12. The engine of claim 10, wherein the chamber bore extends between and is inclusive of a top-dead-center position of a top land of each of the first and second pistons.

13. The engine of claim 10, wherein the first and second annular grooves are each between about 0.010 and about 0.050 inches wide.

\* \* \* \* \*